United States Patent Office 3,061,160
Patented Oct. 30, 1962

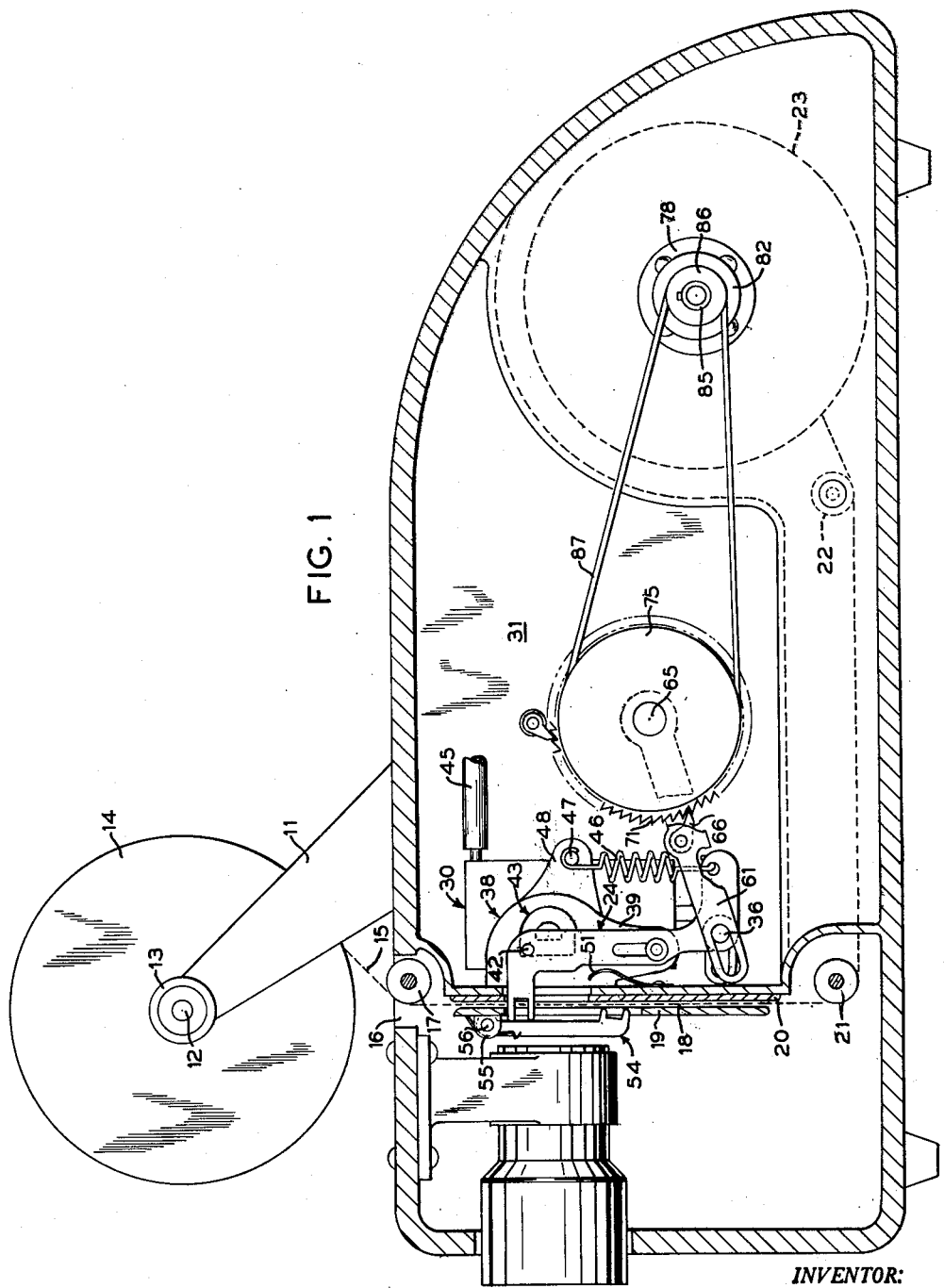

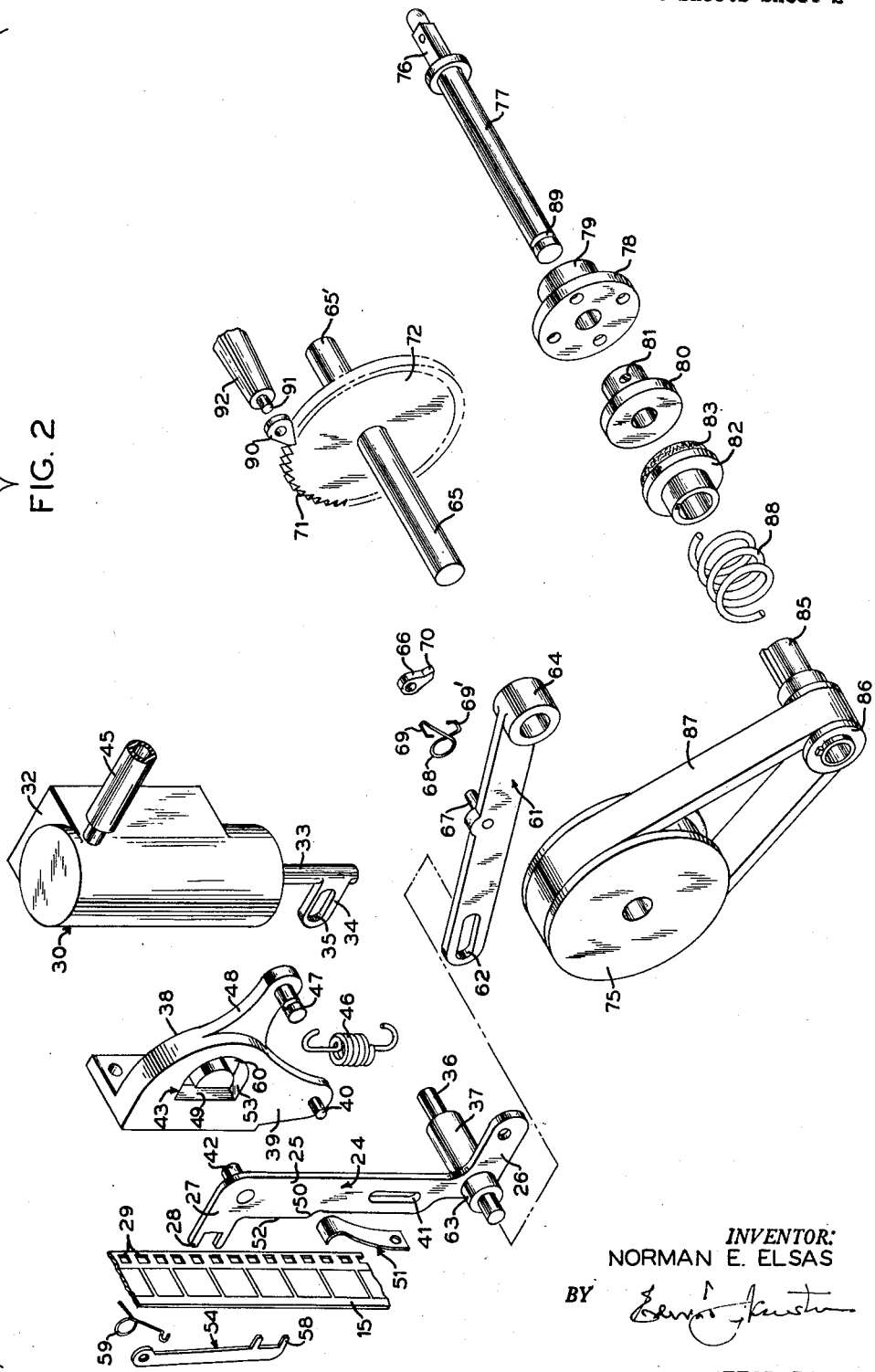

3,061,160
FILM PROJECTOR
Norman E. Elsas, 3025 E. Pine Valley Road NW.,
Atlanta, Ga.
Filed Dec. 16, 1958, Ser. No. 780,891
10 Claims. (Cl. 226—58)

This invention relates to a film projector, and more particularly relates to a projector for viewing individual frames of a long strip of cinematographic film.

One of the objects of this invention is to provide a new and improved projector which utilizes air pressure to actuate film advancing and take-up mechanisms.

Another object of this invention is to provide a projector having a new and improved film advancing mechanism that locks the film in position for viewing in a positive manner.

A further object of this invention is to provide a projector having a new and improved film take-up mechanism translating a reciprocating movement to rotary movement.

Still another object of this invention is to provide a new and improved projector which is simple in construction and operation and is well adapted to meet the demands of economic manufacture.

Numerous other objects, features and advantages of the invention will be apparent from consideration of the following specification taken in conjunction with the accompanying drawings wherein like designators refer to the same or similar parts throughout, and in which:

FIG. 1 is a vertical cross section of a projector according to the present invention.

FIG. 2 is an exploded perspective view of the projector of FIG. 1, showing the functional interrelation of parts.

Referring now more particularly to the drawings, the projector of the present invention may be characterized as having a conventional casing, lens and input film supporting arrangement, the latter including an upstanding arm 11 with a spindle 12 at its outer end. Spindle 12 is provided with a friction retarding mechanism 13 which maintains tension on the film feeding into the projector through opening 16 from supply spool 14. A roller 17, rotatably secured to the projector casing, maintains the film 15 aligned with the slot 18 in conventional film gate 19 and backing plate 20. When the film 15 leaves the slot 18, it goes around and under another roller 21, and under a guide roller 22 onto a take-up spool 23, with rollers 21 and 22 being supported similarly to roller 17 from the projector casing.

To step the film through the projector, there is provided an actuator 24 of Z-configuration having an intermediate body 25, a lower rearwardly extending arm 26, and an upper forwardly extending arm 27, the latter having spaced parallel tines 28 which protrude through the film backing plate 20 and into the perforations, as at 29, along one edge of film 15. In order to actuate the tines 28, pneumatic cylinder 30 is mounted on wall 31 of the projector by means of cradle portion 32. Cylinder 30 is provided with a piston (not shown) to which is attached piston rod 33 formed at its lower end with a forwardly extending lug 34 having an elongate slot 35 to receive drive pin 36 that is fixedly mounted through the actuator at the intersection of the intermediate body 25 and lower arm 26 thereof. Collar 37 maintains proper spacing between the lug 34 and actuator 24. A bracket 38, mounted fast with respect to the wall 31, is provided with depending lug 39 having at its lower end pin 40 in registration with vertical slot 41 in the intermediate body 25 of actuator 24. Cam follower 42, secured in the upper end of actuator 24, is adapted to slidably ride in D-track 43 formed in bracket 38, the arrangement being such that such track governs the motion of actuator 24 in moving the film through the gate assembly.

When pressure is applied to the top of the piston of cylinder 30 through coupling 45 from a suitable manually operated bellows or other source, piston rod 33 will move downwardly against the tension of spring 46, carrying with it actuator 24 and thence film 15. Spring 46 is tensed between pin 47 on rearward lug 48 of bracket 38 and arm 26 of actuator 24. The downward motion of actuator 24 is guided by cam follower 42 in the straight portion or zone 49 of D-track 43. As actuator 24 nears the bottommost point in its travel, a cam surface 50 on the body of the actuator comes into contact with the rounded segment of spring cam 51 mounted on the forward wall of the projector. As the straight upper portion 52 of actuator 24 rides up onto the spring cam 51, actuator 24 is forced to rotate in a clockwise direction about pin 40, with the result that cam follower 42 moves into the base portion or zone 53 of D-track 43, thereby effecting removal of the actuator tines 28 from perforations 29 of film 15 so as to complete the step of presenting a new frame of film for viewing. To positively lock the film in viewing position, tines 28 pass through an elongate aperture in film gate 19 and contact film keeper 54 which is pivotally mounted on gate 19 by lug 55 and pin 56. This arrangement is such that tines 28 on actuator 24 act against the body of keeper 54 and prevent tines 58 thereof from engaging the perforations along the edge of film 15; however, withdrawal of tines 28 from film 15 permits the engagement of tines 58, urged by spring 59, with the film in order to preclude any chance of misregistration of a frame in the viewing position.

The air pressure is then relieved in cylinder 30 by the operator and spring 46 effects return of actuator 24 to its original position, by way of the curved portion or zone 61 of D-track 43. This arrangement is such as to prevent tines 28 from re-engaging the perforations 29 in film 15 until the cam follower 42 is forced forwardly along the upper portion of curved portion 60 of the D-track by the torque exerted from spring 46 about the pin 40. It will be noted that as cam follower 42 moves into base 53 and subsequently into the curved portion 60 of D-track 43, drive pin 36 follows a clockwise path about pin 40, as permitted by slot 36 in lug 34 which allows drive pin 36 to move freely during this action while maintaining a positive coupling for reciprocatory motion of piston rod 33.

In considering the film take-up mechanism of the present invention, a ratchet lever 61 is formed at its forward end with an elongate slot 62 for slidable mounting on drive pin 36, being spaced from actuator 24 by collar 63. The rearward end of ratchet lever 61 is formed with a collar 64 which is rotatably mounted on shaft 65, the end 65' of which is mounted in any suitable bearing (not shown) on wall 31. Approximately midway between slot 62 and collar 64, pawl 66 is mounted on pin 67 which is press-fitted into an aperture in lever 61. Between pawl 66 and lever 61 is a loop spring 68 having return-bent ends 69 and 69' hooking over lever 61 and under pawl 66, respectively, so as to retain pawl 66 on pin 67 and force the end 70 of pawl 66 into teeth 71 of ratchet wheel 72 which is fixedly mounted on shaft 65. It will be noted that by this arrangement vertical movement of actuator 24 is translated into a rotary motion of shaft 65 by pawl 66 engaging the teeth 71 of ratchet wheel 72, the latter rotating counterclockwise as the actuator 24 moves downwardly. This rotation is transferred from shaft 65 to pulley 75 which is fixed on the end thereof in such manner as to retain ratchet lever 61 and hence the pawl 66 in alignment with ratchet wheel 72.

The film 15 is wound onto spool 23 which is releasably mounted on a conventional spindle 76, the spindle shaft 77 of which extends through wall 31 of the projector and is rotatably mounted thereon by means of a flanged bearing cartridge 78 having a boss 79 protruding through wall 31. Spindle 76 is rotated by means of annular friction plate 80 which is secured to spindle shaft 77 by a set screw 81 and is driven by drive plate 82 through a friction disk 83 mounted thereon. Drive plate 82 is slidably keyed to a drive sleeve 85 and rotates therewith at increased speed with respect to shaft 65 through the action of a pulley 86 which is driven by pulley 75 through a belt 87. Constant pressure is maintained between friction disk 83 and friction plate 80 by a spring 88 which acts against one face of pulley 86 and forces drive plate 82 with friction disk 83 against friction plate 80. The pulley 86 and drive sleeve 85 are retained on the spindle shaft 77 by means of a spring clip (not shown) which fits in the cannelure 89 at the end of spindle shaft 77.

It will be noted by those skilled in the art that the friction drive mechanism compensates for the varying amount of film contained on the take-up spool. With a small amount of film on the spool, the spool will have to be rotated a greater amount in order to take up the same amount of film than it would if the spool were nearly full; however, the pulleys 75 and 86 rotate through the same angle at all times during the operation. Therefore, the friction drive arrangement allows the pulleys 75 and 86 to rotate through a constant angle and yet the spindle shaft 77 (and hence the film spool 23) can rotate enough to take up the increments of film whether film spool 23 is empty or full of film.

As actuator 24 returns to its home position, the friction between collar 64 and shaft 65 as well as the pressure of pawl 66 on the teeth 71 of ratchet wheel 72 will tend to rotate pulley 75 in a clockwise direction thereby unwinding the film from spool 23. To prevent this, there is provided a pawl 90 pivotally mounted on a pin 91 of boss 92 which is on wall 31 of the projector. Pawl 90 slips over teeth 71 while ratchet wheel 72 is rotated in a counterclockwise direction as piston rod 33 moves drive pin 35 downwardly. When drive pin 36 moves upward under the action of spring 46, pawl 90 catches a tooth of ratchet wheel 72 to prevent rotation thereof so as to preclude unwinding of the film on spool 23. The return of actuator 24 to its home position also effects disengagement of keeper 54 with the film by passing therethrough and urging keeper 54 in a clockwise direction thus removing tines 58 from perforations 29 in film 15. It will be understood, of course, that a suitable source of illumination is provided within the casing and behind the film plane. This source should be so chosen as to preclude any damage to the film while a frame is being viewed over an extended period due to the heat emitted. It should also be noted that the arrangement provides for backing up or reversing the film. This may be accomplished by merely opening film gate 19 so as to remove the tines 58 and 28 from engagement with the film. With the tines 58 and 28 removed, the film may be pulled manually to the desired position.

It can be seen, then, that the film may be selectively advanced through the gate assembly by a mechanism which has a minimum number of moving parts, and yet provides positive retention of the film throughout the stepping action. Likewise, the film take-up mechanism is of such construction as to maintain a constant minimum tension on the film at all times, even though its input force is of an intermittent nature. Most significant, perhaps, is the effect of the pneumatic cylinder in providing a "soft" or "cushioned" action in advancing the film. Prior art arrangements have utilized "shock" initiation of film movement which often resulted in tearing of the film or damage to the mechanisms. The present invention precludes such tearing by taking advantage of the cushioning effect of pneumatic systems, with the further advantage of preventing hammering of the tines against the film gate. It will be recognized by those skilled in the art that the degree of softness of the action of the pneumatic cylinder can readily be controlled by the inclusion of a pressure regulator valve either in the cylinder, or between the cylinder and the pressure source.

From the foregoing it will be apparent that I have provided a new and improved projector which is well adapted to fulfill the aforestated objects of the invention. Moreover, whereas the invention has been disclosed with respect to a preferred embodiment which gives satisfactory results, it will be apparent to those skilled in the art to which the invention mostly nearly appertains that additional embodiments or variations thereof may be resorted to without departing from the spirit or scope of the invention as defined by the appended claims.

I claim:

1. In a film projector, a generally reciprocatory actuator having a tine for engagement in perforations in strip film, means for guiding the film for longitudinal motion in a given plane, bias means tending to urge the actuator to withdraw the tine from the perforations, means for selectively applying to the actuator forces in opposite directions approximately parallel with the direction of motion of the film to reciprocate said actuator, a cam follower on the actuator, and a fixed cam member having a D-shaped slot receiving said follower, the straight portion of the slot extending substantially parallel with said direction of motion of the film, the actuator having an elongated slot therein, and a mounting pin slidable in the elongated slot and fixed on the cam member.

2. In a film projector, a generally reciprocatory actuator having a tine for engagement in perforations in strip film, means for guiding the film for longitudinal motion in a given plane, bias means tending to urge the actuator to withdraw the tine from the perforations, means for selectively applying to the actuator forces in opposite directions approximately parallel with the direction of motion of the film to reciprocate said actuator, a cam follower on the actuator, and a fixed cam member having a D-shaped slot receiving said follower, the straight portion of the slot extending substantially parallel with said direction of motion of the film, and a mounting pin slidable in the elongated slot and fixed on the cam member, and means on the actuator to convert a part of one of said forces to a force to insert the tine into a perforation by turning the actuator about the pin.

3. In a projector as claimed in claim 2, the last mentioned means being a lever arm extending in a direction about normal to said plane, the means for applying said one of said forces being a spring tensed between the arm and cam member.

4. In a film projector, an actuator of Z-shape having a vertical body portion provided with a vertical slot and having a rearwardly extending lower arm and a forwardly extending upper arm, the latter being provided with film engaging tines, a fixed cam member having a mounting pin fast thereon and in the slot so that the actuator may move generally vertically, the member being provided with a D-shaped slot the straight part of which is vertical, a follower on the actuator and in the D-shaped slot to limit motion of the actuator to a motion for engagement of the tines with the film, advancing same, disengagement, and return to starting position, a spring acting on the lower arm and tending to rotate the actuator about the pin and move the tines forwardly into engagement with film, and means for moving the actuator downwardly, and spring cam means for acting on the actuator in the downward position to neutralize the force of said spring and cause withdrawal of the tines from the film when the follower reaches the bottom of said vertical part of the D-shaped slot.

5. In a film projector as claimed in claim 4, said spring being tensed between the lower arm and the cam member.

6. In a film projector, an actuator of Z-shape having a vertical body portion provided with a vertical slot and having a rearwardly extending lower arm and a forwardly extending upper arm, the latter being provided with film engaging tines, a fixed cam member having a mounting pin fast thereon and in the slot so that the actuator may move generally vertically, the member being provided with a D-shaped slot the straight part of which is vertical, a follower on the actuator and in the D-slot to limit motion of the actuator to a motion for engagement of the tines with the film, advancing same, disengagement, and return to starting position, a spring acting on the lower arm and tending to rotate the actuator about the pin and move the tines forwardly into engagement with film, a pin member on the actuator at the elbow part between the body portion and lower arm and extending laterally from the member, a pneumatic cylinder having a vertical piston rod, and a connector on the rod and pin member for transmitting downward motion of the rod to the pin member and permitting rearward motion thereof.

7. In a film projector for perforated strip film of the type having a housing with a wall provided with an aperture therethrough and means for guiding a strip of film over said aperture, the combination therewith of guide means mounted adjacent said aperture on said housing and having a D-shaped track therein, the straight portion of said D-shaped track being parallel to said aperture and the curved portion of said track extending rearwardly therefrom, an actuator having a central body and tine means projecting forwardly from said central body for engagement with the perforations of said film strip, a cam follower projecting from said actuator into said D-shaped track, a pin mounted on said guide means below said D-shaped slot, there being provided a vertical slot in said body below said cam follower and through which said pin projects, actuation means for moving said actuator in a generally vertical path from an initial position downwardly with said cam follower riding in the straight portion of said track and said tine means engaging said film, means effective as said actuator approaches the lower end of its travel for pivoting said actuator about said pin in a path to withdraw said tine means from said film, and means for urging said actuator in an upwardly and forwardly direction whereby said actuator is returned to its original position with said cam follower moving along the curved portion of said D-shaped track and whereby said tine means are again urged into said perforations.

8. A film projector for perforated strip film comprising, a housing having a wall provided with an aperture therethrough, means for guiding a strip of film over said aperture, guide means mounted adjacent said aperture on said housing and having a D-shaped track therein, the straight portion of said D-shaped track being parallel to said aperture and the curved portion of said track extending rearwardly therefrom, an actuator having a central body and tine means projecting forwardly from said central body for engagement with the perforations of said film strip, a cam follower projecting from said actuator into said D-shaped track, a pin mounted on said guide means below said D-shaped slot, there being provided a vertical slot in said body below said cam follower and through which said pin projects, actuation means for moving said actuator in a vertical path from an initial position downwardly with said cam follower riding in the straight portion of said track and said tine means engaging said film, means effective as said actuator approaches the lower end of its travel for pivoting said actuator about said pin in a path to withdraw said tine means from said film, and means for urging said actuator in an upwardly and forwardly direction whereby said actuator is returned to its original position with said cam follower moving along the curved portion of said D-shaped track and whereby said tine means are again urged into said perforations, and a film keeper effective upon the disengagement of said tines from said perforations for locking said film in a fixed position with respect to said aperture.

9. A film projector for perforated strip film comprising, a housing having a wall provided with an aperture therethrough, means for guiding a strip of film over said aperture, guide means mounted adjacent said aperture on said housing and having a D-shaped track therein, the straight portion of said D-shaped track being parallel to said aperture and the curved portion of said track extending rearwardly therefrom, an actuator having a central body and tine means projecting forwardly from said central body for engagement with the perforations of said film strip, a cam follower projecting from said actuator into said D-shaped track, a pin mounted on said guide means below said D-shaped slot, there being provided a slot in said body below said cam follower and through which said pin projects, actuation means for moving said actuator in a vertical path from an initial position downwardly with said cam follower riding in the straight portion of said track and said tine means engaging said film, means effective as said actuator approaches the lower end of its travel for pivoting said actuator about said pin in a path to withdraw said tine means from said film, and means for urging said actuator in an upwardly and forwardly direction whereby said actuator is returned to its original position with said cam follower moving along the curved portion of said D-shaped track and whereby said tine means are again urged into said perforations, said actuation means including a vertically movable rod connected at the lower end of said body below said slot and means for moving said rod, said means for urging said actuator in an upwardly and forwardly direction including a spring mounted on said housing and a lever arm projecting rearwardly from said body, said spring being connected to the end of said lever arm.

10. A film projector for perforated strip film comprising, a housing having a wall provided with an aperture therethrough, means for guiding a strip of film over said aperture, guide means mounted adjacent said aperture on said housing and having a D-shaped track therein, the straight portion of said D-shaped track being parallel to said aperture and the curved portion of said track extending rearwardly therefrom, an actuator having a central body and tine means projecting forwardly from said central body for engagement with the perforations of said film strip, a cam follower projecting from said actuator into said D-shaped track, a pin mounted on said guide means below said D-shaped slot, there being provided a slot in said body below said cam follower and through which said pin projects, actuation means for moving said actuator in a vertical path from an initial position downwardly with said cam follower riding in the straight portion of said track and said tine means engaging said film, means effective as said actuator approaches the lower end of its travel for pivoting said actuator about said pin in a path to withdraw said tine means from said film, and means for urging said actuator in an upwardly and forwardly direction whereby said actuator is returned to its original position with said cam follower moving along the curved portion of said D-shaped track and whereby said tine means are again urged into said perforations, said means effective as said actuator approaches the lower end of its travel including a spring mounted on said housing, said body being provided with a cam surface engageable with said spring when said actuator approaches said lower end of its travel.

References Cited in the file of this patent

UNITED STATES PATENTS

| | | |
|---|---|---|
| 1,032,160 | Schenck et al. | July 9, 1912 |
| 1,199,733 | Dietz | Sept. 26, 1916 |
| 1,342,560 | Mengel | June 8, 1920 |
| 1,621,334 | Reichmann | Mar. 15, 1927 |
| 1,631,570 | Amet | June 7, 1927 |
| 1,839,132 | Thornton | Dec. 29, 1931 |
| 2,089,388 | Lindstrom | Aug. 10, 1937 |
| 2,425,814 | Laube et al. | Aug. 19, 1947 |
| 2,611,292 | Chandler | Sept. 23, 1952 |

FOREIGN PATENTS

| | | |
|---|---|---|
| 730,899 | Germany | Jan. 28, 1943 |
| 945,378 | France | Nov. 29, 1948 |